(12) United States Patent  
Bergenwall (10) Patent No.: US 8,874,077 B2  
(45) Date of Patent: Oct. 28, 2014

(54) METHOD AND APPARATUS FOR MONITORING AND THEFT PREVENTION

(75) Inventor: Henric Bergenwall, Göteborg (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 46 days.

(21) Appl. No.: 13/368,695

(22) Filed: Feb. 8, 2012

(65) Prior Publication Data

US 2012/0289193 A1    Nov. 15, 2012

Related U.S. Application Data

(60) Provisional application No. 61/485,418, filed on May 12, 2011.

(51) Int. Cl.
*H04M 1/66* (2006.01)
*H04W 12/12* (2009.01)
*H04W 4/00* (2009.01)

(52) U.S. Cl.
CPC .................. *H04W 4/003* (2013.01); *H04W 12/12* (2013.01)
USPC ......... 455/410; 455/558; 455/426.1; 455/455

(58) Field of Classification Search
USPC ......... 95/410, 558, 455, 426.1; 455/410, 558, 455/455, 426.1
See application file for complete search history.

(56) References Cited

U.S. PATENT DOCUMENTS

| | | | |
|---|---|---|---|
| 2003/0051041 A1* | 3/2003 | Kalavade et al. | 709/229 |
| 2003/0061503 A1* | 3/2003 | Katz et al. | 713/200 |
| 2005/0125670 A1* | 6/2005 | Sozzani et al. | 713/171 |
| 2008/0295159 A1* | 11/2008 | Sentinelli | 726/6 |
| 2009/0131054 A1 | 5/2009 | Zhang | |
| 2009/0270129 A1* | 10/2009 | Kuo et al. | 455/558 |
| 2010/0210304 A1* | 8/2010 | Huslak | 455/558 |
| 2010/0227588 A1* | 9/2010 | Bradley | 455/411 |
| 2010/0273424 A1* | 10/2010 | De Petris et al. | 455/41.2 |

(Continued)

FOREIGN PATENT DOCUMENTS

WO    2010140781 A2    12/2010

OTHER PUBLICATIONS

International Search Report and Written Opinion from corresponding International application No. PCT/EP2012/051953, dated Oct. 24, 2012, 16 pages.

*Primary Examiner* — Charles Shedrick
(74) *Attorney, Agent, or Firm* — Rothwell, Figg, Ernst & Manbeck P.C.

(57) ABSTRACT

There is provided a device comprising a mobile broadband module comprising radio communication means. The device further comprises at least a first SIM for providing user domain services and at least a second SIM for providing service domain services. The second SIM is isolated from an end user of the device. According to an embodiment, the first SIM is associated with the end user of the device, wherein the end user may be associated with a first identity, and wherein the second SIM is associated with a service provider, the service provider being associated with a second identity. A method comprising: identifying which of the first and the second communication paths a command is issued from; and continuing with the command or discontinuing with the command in dependence on the identified path, such that the end user is not able to perform operation on to access the isolated second SIM.

19 Claims, 5 Drawing Sheets

(56) References Cited

U.S. PATENT DOCUMENTS

| | | | |
|---|---|---|---|
| 2011/0059773 A1* | 3/2011 | Neumann et al. | 455/558 |
| 2011/0154460 A1* | 6/2011 | Khare et al. | 726/7 |
| 2011/0269456 A1* | 11/2011 | Krishnaswamy et al. | 455/426.1 |
| 2012/0135715 A1* | 5/2012 | Kang et al. | 455/412.1 |

* cited by examiner

METHOD AND APPARATUS FOR MONITORING AND THEFT PREVENTION

This application claims the benefit of U.S. Provisional Patent Application No. 61/485,418, filed May 12, 2011. The entirety of said provisional application is incorporated by reference herein.

TECHNICAL FIELD

The present invention relates to devices and methods for theft protection, security and surveillance. More particularly, the invention relates to security aspects for a broadband module to be inserted in a device.

BACKGROUND

The growing availability of notebooks, smart phones and other mobile devices with embedded mobile broadband, also called computing devices, is paving the way for a raft of new services and applications.

A subscriber identity module or subscriber identification module (SIM) is an integrated circuit that securely stores the International Mobile Subscriber Identity (IMSI) and the related key used to identify and authenticate subscribers on mobile telephony devices. It is often referred to as a SIM card.

According to document GSM 02.17 V8.0.0 (1999-11), a GSM (Groupe Spécial Mobile) MS (mobile station) comprises a mobile entity (ME) and a subscriber identity module (SIM). The SIM is a removable module. The SIM contains the International Mobile. Subscriber Identity (IMSI) which unambiguously identifies a subscriber. Without a valid IMSI, GSM service is not accessible except emergency calls.

The user interface (MMI) of the ME related to SIM operations is defined in GSM 02.30.

GSM 02.09 specifies a security function for authenticating the SIM. This function, which is mandatory for any MS, is based on a cryptographic algorithm, A3, and a secret subscriber authentication key, Ki, both of which are located in the SIM.

The SIM provides storage of subscriber related information. This data is of three types: (1) data fixed during administrative phase; e.g. IMSI, subscriber authentication key, access control class; (2) temporary network data; (3) service related data; e.g. Language Preference, Advice of Charge.

The SIM may also contain further applications. According to document GSM 02.17 V8.0.0 (1999-11), the SIM has a physical layout as "ID-1 SIM" and as a "Plug-in SIM".

Format and layout of the ID-1 SIM shall be in accordance with ISO 7816-1 and has a polarization mark which indicates how the user should insert the card into the ME.

As is well known, an UICC (Universal Integrated Circuit Card) is a so-called "smart card" comprising a processor which provides a computing basis for identification, authentication and security purposes.

An UICC may provide the basis for multiple applications. An USIM application provides identification of the user vis-à-vis one of the telecommunication standards: Universal Mobile Telecommunications System (UMTS), High Speed Packet Access (HSPA) or Long Term Evolution (LTE). The CDMA SIM (CSIM) is another application that provides access to CDMA networks. Other possible applications comprise an IP multimedia Services Identity Module (ISIM) for mobile access to multimedia services and non-telecom applications such as payment. For example, many subscribers have a UICC with USIM and IP multimedia Services Identity Module (ISIM) applications for phone service and multimedia respectively. The UICC can communicate using Internet Protocol (IP).

Existing computing devices with embedded mobile broadband modules (MBM) require access to such an Universal Integrated Circuit Card (UICC) for accessing services for the user. This cannot always be guaranteed since UICC can be physically removed from the device. In fact, most computing devices that hold a UICC are designed so that the UICC should be easy to remove.

Further, the penetration rate for embedded modules with a data subscription is quite low as of today. As of today, the subscriber needs a specific subscription to support specific services (for example a specific data subscription to access data services).

Prior art document 3GPP TS 33.812 v.9.2.0 (2010-06) relates to security aspects of remote provisioning and change of subscription for Machine to Machine (M2M) equipment and describes in section 4.2 three options with regard to UICC:

The UICC could be mechanically attached to the M2M equipment in such a way as to make it infeasible to remove the UICC, or where removing the UICC would render it permanently unusable. The USIM application would then still run and be managed in a secured, non-removable execution environment which is tamper resistant, namely the UICC.

The MCIM application could be integrated within the M2M equipment in a protected module (i.e. without a physical UICC). That protected module would be required to provide for the MCIM application a secured execution and storage environment which is tamper resistant in the M2M equipment. Such an environment requires counter-measures against logical and physical attacks on the MCIM application, similar to counter-measures that are currently provided by a physical UICC.

The USIM application is implemented on a removable UICC, but appropriate techniques could be applied to discourage or invalidate the UICC removal (i.e. making the UICC removal unproductive or even counterproductive for the attacker). These techniques may include physical countermeasures.

Prior art document "M2M Remote-Subscription Management, Luis Barriga et al, Ericsson Review 1, 2011 describes a machine-to-machine, M2M, communications identity module, MCIM, describes that an unauthorized party should not be able to remove or tamper with the UICC. One way of achieving this is to hermetically seal the device during production. This approach is appropriate, for example, in the health-care and automotive industries. Another solution is a soldered, embedded UICC, referred to as an eUICC, on the device PCB board. This document illustrates how an MCIM-enabled device can be initially provisioned and then re-provisioned for a new operational home operator, HO.

Prior art document Embedded SIM Task Force Requirements and Use Cases 1.0, 21 Feb. 2011, GSM Association Non-Confidential White paper; Embedded SIM Task Force: Requirements & Use Cases, discuss use cases for an UICC (eSIM), which is embedded in a communication device, i.e. where the UICC is not easily accessible and replaceable. This type of UICC is compatible with Machine-to-Machine (M2M) applications. This document describes an eUICC state model.

It appears that in the art, the notion eSIM covers embedded SIM's, such that MCIM can be seen as one variant of eSIM. Both MCIM and eSIM is believed to be seen as the hardware components that contains zero or more SIM applications.

"Evaluating Intel® Anti-Theft Technology", IT@Intel Brief, Intel Information Technology, Business Solutions, July 2010, deals with an anti-theft technology for Laptop computers according to which hardware as well as data is disabled if the computer is lost or stolen, by means of a SMS message that can be delivered over LAN, WLAN or 3G network from a security provider.

Prior art document EP2339815 shows a method and apparatus for remote management over a wireless wide-area network using short message service. A short message over a wireless wide-area network, WWAN, is received using an out-of-band, OOB, processor of a computing device. The OOB processor is capable of communicating over the WWAN irrespective of an operational state of an in-band processor of the computing device. The computing device executes at least one operation with the OOB processor in response to receiving the short message.

A problem with existing SMS based monitoring and anti theft solutions is that tampering with the SIM application may render the disabling by SMS unworkable.

SUMMARY

It is a first object of the invention to provide a device having an enhanced security level and protection.

This object has been achieved by a device comprising a mobile broadband module comprising radio communication means. The device further comprises at least a first subscriber identity module, SIM, for providing user domain services and at least a second subscriber identity module, SIM, for providing service domain services. The second SIM is isolated from an end user of the device.

According to a further aspect, the first SIM is associated with the end user of the device, wherein the end user may be associated with a first identity, and wherein the second SIM is associated with a service provider that is associated with a second identity.

In an embodiment of the invention the device further comprises a plurality of applications and or components, a first communication path for providing communication between at least a first application and/or component and the mobile broadband module. A second communication path is arranged for providing communication between at least the first application and/or component and the mobile broadband module. The first SIM is communicating over at least the first communication path with at least the first application and/or component, and the second SIM communicating over at least the second communication path with at least the first application and/or component, without using the first communication path.

The invention further provides a method for a device comprising a mobile broadband module comprising radio communication means; wherein the device further comprises at least a first subscriber identity module, SIM, for providing user domain services and a second subscriber identity module, SIM, separate from the first SIM, for providing service domain services, a plurality of applications and or components, and a first communication path for providing communication between at least a first application and/or component and the mobile broadband module, a second communication path for providing communication between at least the first application and/or component and the mobile broadband module. The first SIM is communicating over at least the first communication path with at least the first application and/or component, and the second SIM communicating over at least the second communication path with at least the first application and/or component, without using the first communication path.

The method comprising the steps of: identifying which of the first and the second communication paths the command is issued from, and continuing with a command or discontinuing with a command in dependence on the identified path, such that the end user is not able to perform operation on to access the isolated second SIM.

There is moreover provided a method for initially setting up the device, prior to identifying commands on the first and second communication paths and continuing or discontinuing with commands in dependence on identified paths. The initial setting up of the device comprising the steps of: downloading the second SIM; activating the second SIM; transferring an encrypted command comprising the identity associated with the service domain services; and enabling a security feature of the service domain services.

A further aspect of the invention involves: Method for a device comprising a mobile broadband module comprising radio communication means; the device further comprising at least a first subscriber identity module, SIM, for providing user domain services and a second subscriber identity module, SIM, separate from the first SIM, for providing service domain services, a plurality of applications and or components, and a first communication path for providing communication between at least a first application and/or component and the mobile broadband module, a second communication path for providing communication between at least the first application and/or component and the mobile broadband module, the first SIM communicating over at least the first communication path with at least the first application and/or component, and the second SIM communicating over at least the second communication path with at least the first application and/or component, without using the first communication path. The method comprising the steps of initially setting up the platform by: downloading the second SIM; activating the second SIM; transferring an encrypted command comprising the identity associated with the service domain services; and enabling a security feature of the service domain services.

For the embodiments above, it is provided that secure services can be implemented in a safe and efficient manner.

Further advantages of the invention will appear from the following detailed description of the invention.

DETAILED DESCRIPTION

The present invention relates to a device PL comprising a mobile broadband module 101 comprising radio communication means 306, 307.

The device further comprises at least a first subscriber identity module, SIM, 102-1 for providing user domain services and a second subscriber identity module, SIM, 102-N; 102N' for providing service domain services, the second SIM being isolated from an end user of the device.

Embodiments of the present invention also relate to a method of allowing access for one or more specific services to at least one non-removable SIM/USIM, while on the other hand the end user is disallowed access to that SIM/USIM. That is, the end user should not be able to intentionally or unintentionally perform operation on that isolated SIM(s)/USIM(s) or any operation that requires access to the isolated SIM(s)/USIM(s).

Guaranteeing that SIMs/USIMs are accessible for one service (or more), while they are isolated to an end user, opens a business model for special services, as the data traffic generated by the service and the data traffic generated by the end user can be separated on different mobile subscriptions (SIMs/USIMs).

One aspect of the invention is that if an end user has its own mobile subscription (e.g. USIM), corresponding SIM/USIM should co-exist with the special services' SIMs/USIMs through the use of technologies that allow simultaneous usage of multiple SIMs/USIMs. Examples of such technologies are Active Dual SIM and Dual SIM Dual Standby (DSDS). This way, special services could be used simultaneously with other SIMs/USIMs with little or no impact. However, this invention is not limited to the scenario where the end user has her own mobile subscription.

That is, with the SIM/USIM being isolated from the end user, it is possible for a third party service provider to directly or indirectly, via possibly a mobile virtual network operator (MVNO), to own the subscription on that SIM/USIM.

With the SIMs/USIMs being isolated from the end user, there is no security risk of the SIMs/USIMs being always unlocked. This is very beneficial for services that require auto connectivity and where the service without end user interaction has to establish the network connection.

Using separate SIMs/USIMs for special services from that to be used by end user also circumvent the risk of "the domain of special services" and "the domain end user" compromising each other.

Figure 1:
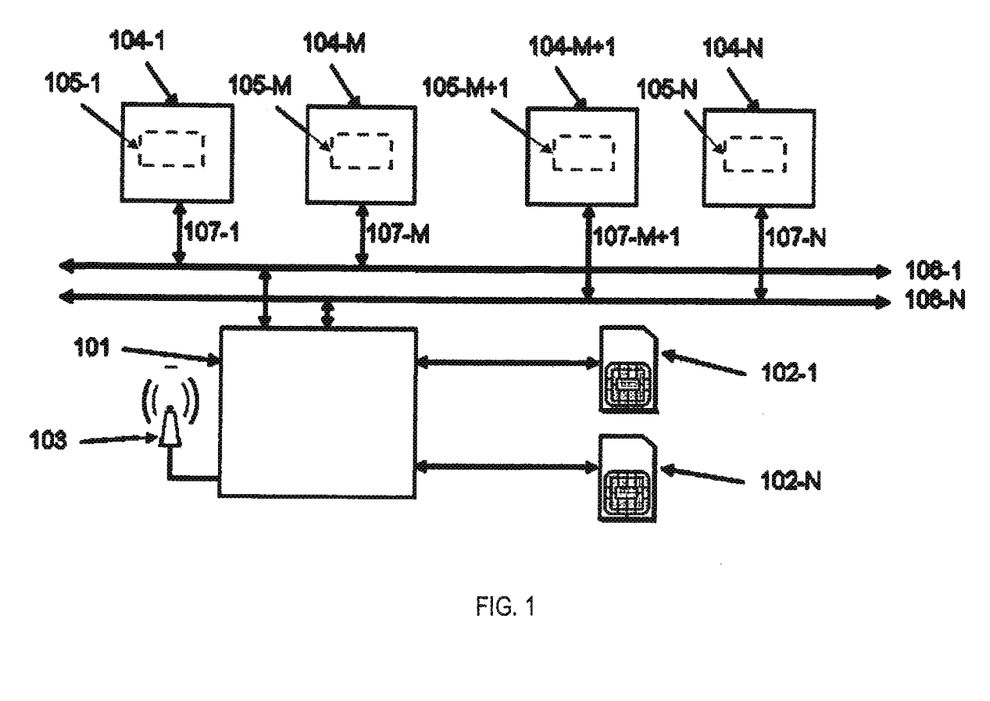
FIG. 1 shows a representation of an embodiment of a device according to the invention.

FIG. 1 schematically illustrates a layout of a device according to an embodiment the invention. The device comprises a MBM device/NIC 101, and one or more SIM/USIM 102-1 to 102-N. The subscript N indicates that there may be any number of the instances in question. This is valid for all further instances of N in relation to all features in the description. The device further comprises at least one antenna 103. One or more mobile services that operate on the computing device may be implemented as one or more applications 104-1 to 104-N. Applications may operate in different internal devices/chipsets 105-1 to 105-N on the host. Different chipsets may operate in different power states, such as the power states defined by the ACPI (Advanced Configuration and Power Interface) specification.

In the following, we shall refer to various kinds of subscriber identity module hardware components or subscriber identity module applications or combinations thereof as SIM's. Also, Universal subscriber identity modules will be referred to as a type of SIM. Moreover, a M2M CIM, MCIM, USIM, eSIM will be referred to as SIM.

Applications may implement mobile services that require mobile network/radio communication. These applications need to communicate with the MBM device 101 for such services. The MBM device may operate in different power states such as the power states defined by the ACPI specification.

The MBM device may be connected to one or more physical interfaces 106-1 to 106-N. Different physical interfaces may operate in different host power states, such as the power states defined by the ACPI specification. An MBM device may be able to communicate via one or more logical data channels 107-1 to 107-N on each physical interface.

For applications to communicate with the MBM device, they need to talk directly over a physical interface or indirectly over a logical data channel with the MBM device.

Some of the MBM device's functionality requires radio communication with a mobile network. To access the mobile network, the MBM device needs access to the one or more SIM/USIM 101-1 to 101-N, which can be either physical or virtual SIM/USIM identities (i.e. embedded SIM/USIM and/or MCIM).

In other words there is provided a device comprising a mobile broadband module 101) comprising radio communication means. The device further comprises at least a first subscriber identity module, SIM, 102-1) for providing user domain services and at least a second subscriber identity module, SIM, 102-N; 102N') for providing service domain services. The second SIM is isolated from an end user of the device.

According to an embodiment, the first SIM 102-1) is associated with the end user U) of the device, wherein the end user may be associated with a first identity, and wherein the second SIM 102-N; 102-N') is associated with a service provider, wherein the service provider being associated with a second identity.

In an embodiment of the invention the device further comprises a plurality of applications 104-1; 104-N) and or components 105-1, 105-N), a first communication path 106-1; 107-1) for providing communication between at least a first application 104-1) and/or component 105-1) and the mobile broadband module 101). The device also comprises a second communication path 106-N; 107-N) for providing communication between at least the first application 104-1) and/or component 105-1) and the mobile broadband module 101). The first SIM 102-1) is communicating over at least the first communication path 106-1) with at least the first application 104-1) and/or component 105-1), and the second SIM 102-N) communicating over at least the second communication path 106-1) with at least the first application 104-1) and/or component 105-1), without using the first communication path 106-1).

Figure 2:
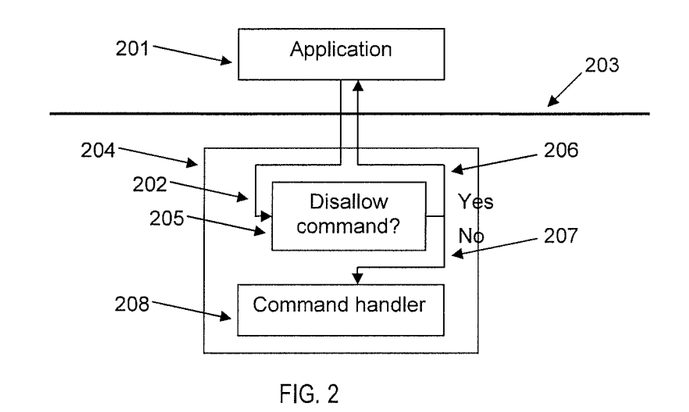
FIG. 2 shows a method according to the invention.

FIG. 2 schematically shows an embodiment of a method for deciding when to allow or disallow commands towards the MBM device depending on the direction of the communication path from which the command was issued.

Box 201 illustrates a service/application issuing a command 202 over a physical interface/logical data channel 203 towards a MBM device 204. Box 205 illustrates the decision process. The decision process operates in the MBM device. Depending on the outcome of the decision process, the MBM device sends a command response 206 to the command issuer 201 discontinuing the command execution or forwards the command 202 (forwarding is marked as 207) to the command handler 208 continuing the command execution.

Figure 3:
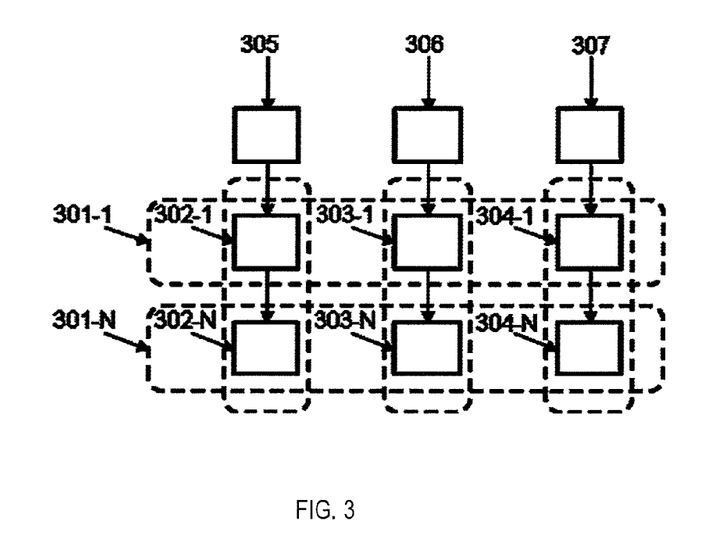
FIG. 3 is a logical representation of a device according to an embodiment of the invention.

FIG. 3 schematically illustrates an embodiment the logical layout of virtual UE(s) 301-1 to 301-N. Virtual UE(s) 301-1 to 301-N encapsulates a set of virtual components 302-1 to 302-N, 303-1 to 303-N, 304-1 to 304-N, where virtual component 302-1 to 302-N is a virtual SIM/USIM and where virtual component 303-1 to 303-N is a virtual radio component. Virtual component 304-1 to 304-N may also be present in each UE. Examples of additional virtual components 304-1 to 304-N are a virtual GPS component and a virtual connection manager component.

Components 305, 306, 307 are each a software package with a possible hardware related chipset, which encapsulates a set of related functions and/or data. Components 305, 306, 307 are physical equivalents to virtual components 302-1 to 302-N, 303-1 to 303-N, 304-1 to 304-N, i.e. component 305 is a physical SIM/USIM, component 306 is a physical radio component and component 307 may be a physical GPS component or a physical connection manager component. Additional components 307 may be present if additional virtual components 304-1 to 304-N are present.

Figure 3A:
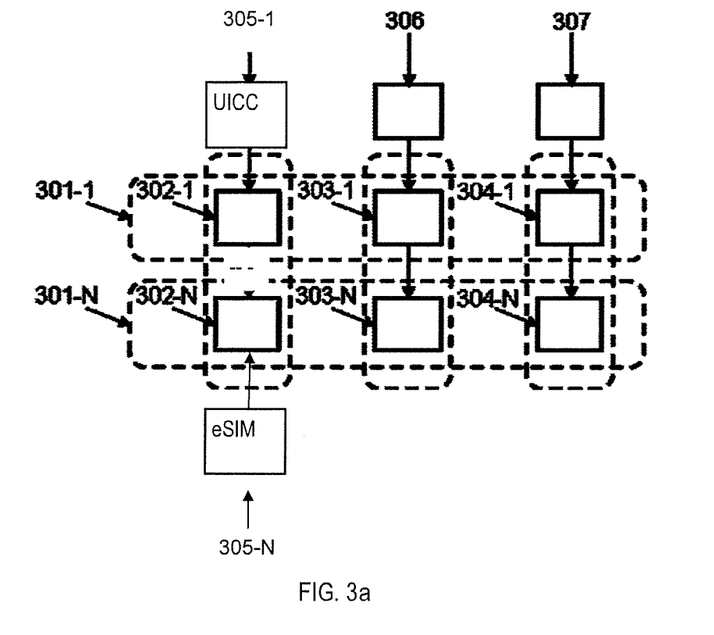
FIG. 3a shows a further logical representation according to an embodiment of the invention.

FIG. 3a shows an embodiment where component 305 of FIG. 3 is constituted by two individual components 305-1, e.g. an UICC, reference number UICC, and 305-N e.g. an eSIM. Component 305-1 provides the basis for virtual component 302-1, which provides the SIM associated with the end user, and component 305-N provides the basis for the virtual component 302-N which provides the SIM associated with the service provider.

A virtual component 302, 303, 304 is an extended interface towards a component 305, 306, 307, where at least one part of the component's 305, 306, 307 encapsulated set of related functions and/or data is instantiated by the virtual component 302, 303, 304. Virtual components 302, 303, 304 may be independent of each other and unaware of each other's state.

The state of the physical components 305, 306, 307 depend partly on how the states of the virtual components 302, 303, 304 change. For example, the state of the physical component should be such that it supports a level of functionality that is at least on par with the highest functionality requested by its instantiated virtual components. For example, if two out of three virtual components that are instantiated from a specific physical component, are in state "off" and the third virtual component in state "on", then the physical component must be at least in state "on". The physical components supported level of functionality may depend on other factors as well, such as global MBM states.

For example, one implementation of this could be that two different services or set of services use two different virtual UEs 301-1 to 301-N, where the virtual UEs 301-1 to 301-N use instantiation of components 305, 306, 307; a virtual SIM/USIM component 302-1 to 302-N, a virtual radio component 303-1 to 303-N and a virtual GPS component 304-1 to 304-N.

In this example, although the physical SIM/USIM component 305 and physical radio component 306 only supports being either attached or detached to a mobile network, instantiation of the SIM/USIM component 305 and the radio component 306 makes it possible for the two services to be virtually detached and attached independently of each other. The physical component 305 can be seen as a container accommodating a SIM application. Each service may be in different virtual radio states. Instantiation of the GPS component 307 makes it possible for the two services to virtually turn on/off and access the GPS independently of each other.

Comparing the solutions set out above with a solution involving only a single SIM, it is noted that the single SIM solution is associated with the following disadvantages:

For instance, the "the domain of the security service" may be compromised by the "the domain end user":

An end user may remove a SIM/USIM or change connection details like the APN settings which may cause a service to be unusable.

Putting a computing device to sleep/deep sleep may cause the communication path between the application implementing the service and the MBM device to be broken. For example, the physical interfaces used for the implemented service may not be available when a computing device enters sleep mode.

An end user's subscription may run out of money, which may cause the service to be unusable.

A service transported over SMS, may be undeliverable if the SIM/USIM SMS storage is full.

An end user may change the PIN code of SIM/USIM, which may make the USIM/SIM unusable for service.

Moreover, for single SIM solutions, the "user domain" may be compromised by the "service domain of the security provider", because: A service may require auto connectivity, which may drive an end user to not lock the users SIM. If the computer is stolen with unlocked SIM/USIM, the risk is that a thief can cause high cost for roaming data traffic besides possibly compromising the privacy of the end-user.

The present invention obviates at least some of the above disadvantages.

Figure 4:
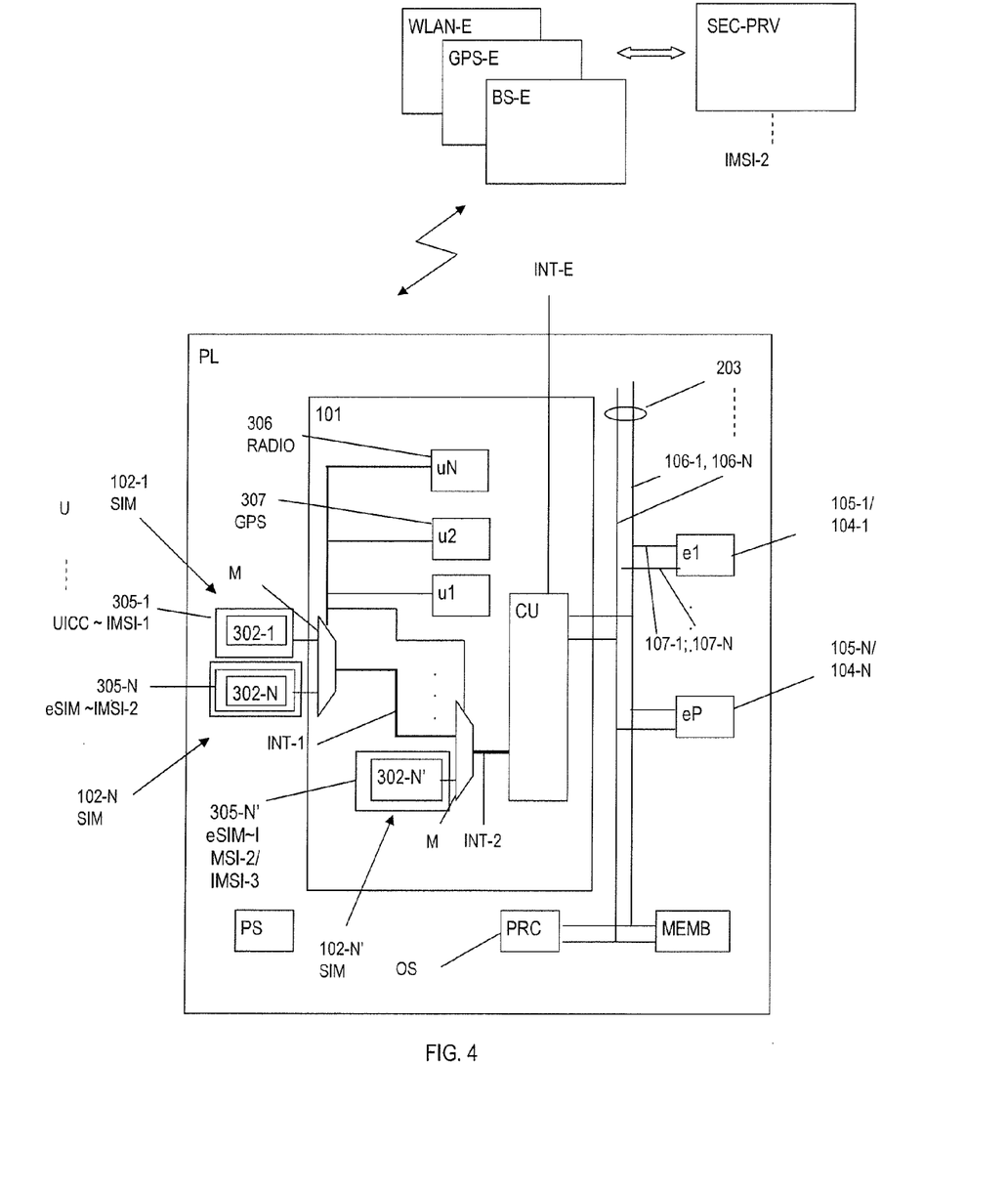
FIG. 4 shows an embodiment of the invention and the context within it operates.

In FIG. 4, a further embodiment of the invention is shown.

A platform or device PL comprises a mobile broad band module 101, a power supply PS, a local processor PRC having an operating system OS, a memory MEMB, and a number of device based components 105-1; 105-N, and/or applications, 104-1; 104-N, e1 . . . eP.

The components and applications are communicating with the broadband module over at least two communications paths. A communication path may be a physical interface 106-1; 106-N or a logical interface 203, 107-1; 107-N, as further shown in FIG. 1.

The device may be a computer, such as a laptop or mobile telephone or the like and the mobile broadband module may be a physical module which is mounted on the platform, PL.

The broadband module 101 comprises a number of applications and/or components u1, u2, uN, such as a radio component 306 and a GPS component 307. The functions associated with at least some of these components may also be provided as applications using a common radio chipset. The mobile broadband module moreover comprises a central unit CU. There is provided a first SIM 102-1 based on e.g. an UICC, 305-1, being associated with a virtual component 302-1.

There may furthermore be provided a second SIM 102-N in the form of an embedded SIM 102-N either in the form of a hardware component such as an eSIM (Embedded SIM), eSIM2, or a software component, such as an MCIM, in both cases, embedded on the platform PL. The second SIM 102-N may be formed as a physical component 305-N and virtual component 302-N.

The first SIM is associated with the user, associated with identity IMSI-1. The second SIM is associated with identity IMSI-2 associated with, and e.g. being owned by, the service provider SEC-PRV.

The second SIM 102-N' may also be embedded in the mobile broadband module 101 as physical component 305-N' and virtual component 302-N'.

As a still further option, two additional SIMs are provided 102-N and 102n' in addition to the first SIM 102-1. In such a case, three IMSIs are provided, IMSI-1, IMSI-2 and IMSI-3, relating to three parties.

The SIM's may be connected via one or more a multiplexers M, by means of one or more interfaces, INT-1, INT-2 to the central unit. The central unit moreover is communicating over or via the first and second communication paths.

The device communicates for instance with a radio base station, BS-E, such as a UMTS or LTE base station, a positioning satellite service GPS-E, such as GPS or similar positioning system, a wireless LAN base station, WLAN-E, or alternative local wireless technology. The base stations may be communicating with a service provider, SEC-PRV, providing security services. Communication may also take place over a wired interface, INT-E, from the central unit, INT, such as over Ethernet.

As stated above, the end user of the platform may be the owner of a first SIM 102-1 and be associated with a first identity IMSI-1, that is, the service provider has a subscription associated with the second SIM. The first SIM could be arranged on a UICC on the platform. This UICC could be accessible to the end user, i.e. not be embedded in the platform, so the user can insert a UICC herself in the device.

The service provider may own the second SIM, 102-N; 102-N' and be associated with a second identity, IMSI-2. According to one embodiment, the second SIM, 102-N is arranged on eSIM which is physically embedded in the platform, that is, the user is not able to remove the UICC without destroying the platform. Another, embodiment provides that the second SIM, 102-N' is arranged as an embedded SIM in the form of either a hardware component such as an eSIM or a software component such as an MCIM in the mobile broadband module, 101. The option of having more than two SIM cards, also exists, such that e.g. SIM's 102-1, 102-N and 102-N' are provided.

The provision of the at least two SIM's may be implemented along the explanation provided in WO2011/092254 (A1) and may be arranged as a dual SIM or dual SIM dual standby configuration.

According to the invention the purpose of the second SIM is to enable the service provider to control the device. This function may provide for several services. One would involve that the end user engages an agreement with the service provider for delivering antitheft services, such as location monitoring of the device and anti-theft provisions, for instance by providing a "kill pill" to the device or by offering continued tracking if the device is stolen. Another, service could involve that a third party owns the platform and offers it for use to the end user under certain conditions and agreements, wherein if the end user breaches such agreements, the third party implements certain actions, such as changing access to services, on the device.

To recapitalize, according to the invention, there are provided various embodiments according to which the device further comprises decision process 205 means for continuing with a command or discontinuing with a—restricted—command, by identifying which of the first and the second communication paths 106-1; 107-1; 106-N; 107-N the command is issued from, such that the end user is not able to perform operation on to access the isolated second SIM.

One characteristic is that the communication between the service provider and the device PL is not noticeable to the end user U of the device.

The second SIM 102-N; 102-N' enables the service provider SEC_PRV to control applications in the broadband module or on the device via communication with the device PL over the radio communication means 306, 307, such as by a short message service, SMS, or by communication over an external interface to the device INT-3.

However, SMS is not the only way. A TCP/IP communication could also be used. It is possible that Intel's Management Engine, which is an example of component 105, can implement their own TCP/IP stack, enabling a secondary TCP/IP stack apart from the device's own TCP/IP stack. In this way, 105 can have IP connectivity towards the security provider. This IP connectivity is advantageous to have in the BIOS (basic input/output system) when an update of virus definitions is to be downloaded from the security provider.

BIOS is an example of "a state" where the PL's first communication path (ex. USB) towards the MBM device is not up (hence, user SIM is not accessible) but where the secondary communication path (ex. SMBus) is up. Hence, access to the second SIM is possible.

In an embodiment, the first communication path is a first interface 106-1 and the second communication path is a second interface 106-N.

It is an option that the first interface and second interface is a Peripheral Component Interconnect Express, PCIe, interface wherein one of the first and send interface is arranged on the Universal Serial Bus, USB, interface pins (3 pins) and the other is arranged on the System Management Bus, SMBus, (2 pins). However, PCIe is only one many types of connectors.

In one embodiment, the first communication path is a first logical data 107-1 channel and wherein the second communication path is a second logical data 107-N channel.

In a further embodiment of the device, the second SIM 102-N, 102-N' comprises a physical component 305-N; 305N' embedded in the broadband module 101 or in another part of the device PL, the physical component accommodating a SIM application or virtual SIM component 302-N; 302-N'.

The physical component 305-N; 305-N' of the second SIM may be a Universal Integrated Circuit Card, UICC, MCIM or eSIM, embedded on the device PL or in the broadband module 101.

According to a further variant, a third SIM is provided 305; 305N'.

In an embodiment, the first SIM and the second SIM communicates with the broadband module 101 via at least one internal interface INT_1; INT_2 and wherein communication on said internal interface for the first and the second SIM is multiplexed, such that applications and/or components in the device or broadband module 101 can read SIM related information at least sequentially, but so speedily that it may appear substantially simultaneously to the end user.

In an embodiment, the radio communication means 306 is having at least two radio stacks, permitting two user entities being associated with the first and second SIM to be at least attached to a radio network BS_E simultaneously.

In an embodiment, the first and the second logical channels 107-1; 107-N are at least interfacing to virtual components 104-1; 104-N or applications.

The invention may be configured by a method involving the service provider of the service domain (I). The invention may also initially be taken into operation in a manner wherein the second SIM is initially disabled (II) by configuration.

As mentioned above, the embedded hardware component 305-N may be seen as a container of zero or more SIMs (SIM applications). The embedded hardware component could e.g. be an eSIM, forming the second SIM.

I—Configuration of the Second SIM

By way of example, the end-user purchases a product PL with the broadband module 101. When purchased, the embedded SIM, 305-N/305-N', which can be seen as an empty "container" containing zero SIMs.

Figure 5:
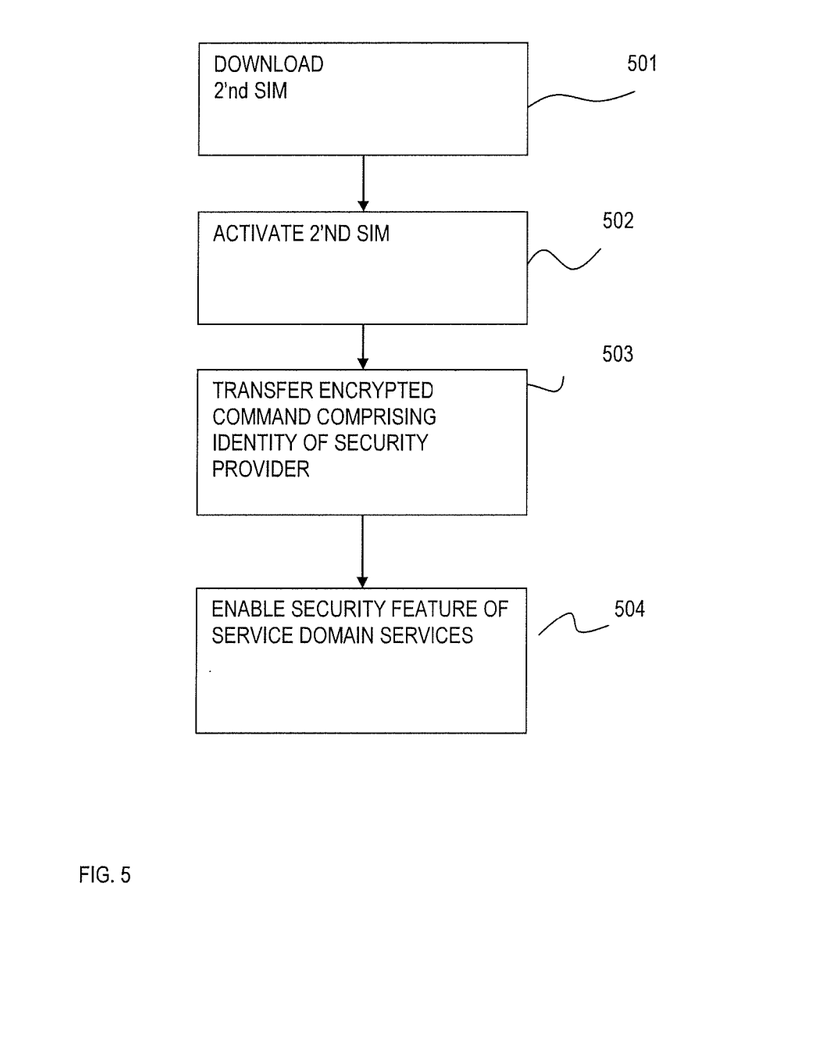
FIG. 5 shows an aspect of the invention relating to activation of a service domain feature.

To activate a service domain service feature, the end-user hands over the product PL to a service provider also denoted security-provider SEC-PRV. This is illustrated in FIG. 5. The service provider may be an agent who has a trusted relationship with the security provider. The service provider performs a series of configurations to the product PL.

The security-providers makes sure that a—second SIM application, 302-N/302-N' is (a) downloaded to, and—step 501, (b) activated on the eSIM, 305-N/305-N'.—step 502.

The result is that SIM "container" 305-N/305-N' is not empty anymore.

These steps are known per se in the prior art.

The second SIM, 102-N, comprising the downloaded SIM application 302-N/302-N' is subsequently configured to be used for a security feature of the service domain services such as for theft prevention purposes.

The security-provider transmits a secret command/encrypted command from the device over one of interfaces 106-1 or 106-N, or over Ethernet interface INT-E to the broadband module 101. The command contains the identity, IMSI-2, associated with the security provider and with the second SIM that should be used for service domain services.—step 503

The broadband module 101 acts upon the reception of such a command, enables the service domain service and couples the second SIM to features of that service.—step 504.

The result is that the broadband module now understands that the second SIM 102-N/102-N' and its application 302-N/302-N' contained in the embedded SIM "container" 305-N/305-N' should be used for theft prevention purposes.

It should be noted that it may be provided that the SIM in the SIM "container" can be automatically detected and automatically used by the broadband module for antitheft purposes. If that is the case, as soon as this SIM exists within the SIM "container" and can be detected, steps 503 and 504 can be avoided.

The first SIM being in the control of the end user may be activated as is known in the art, by e.g. UICC SIM 102-1 in the form of UICC 305-1 in the platform PL.

II—Second SIM is Disabled by Configuration

In case the theft prevention feature is not enabled on the broadband module, or the broadband module cannot establish communication to a SIM suitable for theft prevention, the second SIM can be seen as "disabled by configuration".

When this happens, the theft prevention feature may be arranged so that it can still be enabled/coupled with the first SIM associated with the end user.

Hence there is provided, a method for a device PL comprising a mobile broadband module 101 comprising radio communication means 306, 307; the device further comprising at least a first subscriber identity module, SIM, 102-1 for providing user domain services and a second subscriber identity module, SIM, separate from the first SIM, 102-N; 102N' for providing service domain services, a plurality of applications 104-1; 104-N and or components 105-1, 105-N, and a first communication path 106-1; 107-1 for providing communication between at least a first application 104-1 and/or component 105-1 and the mobile broadband module 101, a second communication path 106-N; 107-N for providing communication between at least the first application 104-1 and/or component 105-1 and the mobile broadband module 101, the first SIM 102-1 communicating over at least the first communication path 106-1 with at least the first application 104-1 and/or component 105-1, and the second SIM 102-N communicating over at least the second communication path 106-1 with at least the first application 104-1 and/or component 105-1, without using the first communication path 106-1; the method comprising the steps of: identifying which of the first and the second communication paths 106-1; 107-1; 106-N; 107-N the command is issued from; continuing 206 with a command or discontinuing 207 with a—if restricted—command in dependence on the identified path, such that the end user is not able to perform operation on to access the isolated second SIM.

There is also provided a method for initially setting up the device PL, prior to identifying commands on the first and second communication paths and continuing or discontinuing with commands in dependence on identified paths, the initial setting up of the device comprising the steps of: downloading 501 the second SIM 102-N, 102N'; activating 502 the second SIM 102-N, 102N'; transferring 503 an encrypted command comprising the identity associated with the service domain services; and enabling 504 a security feature of the service domain services.

Finally, there is provided a method for a device PL comprising a mobile broadband module 101 comprising radio communication means 306, 307; the device further comprising at least a first subscriber identity module, SIM, 102-1 for providing user domain services and a second subscriber identity module, SIM, separate from the first SIM, 102-N; 102N' for providing service domain services, a plurality of applications 104-1; 104-N and or components 105-1, 105-N, and a first communication path 106-1; 107-1 for providing communication between at least a first application 104-1 and/or component 105-1 and the mobile broadband module 101, a second communication path 106-N; 107-N for providing communication between at least the first application 104-1 and/or component 105-1 and the mobile broadband module 101, the first SIM 102-1 communicating over at least the first communication path 106-1 with at least the first application 104-1 and/or component 105-1, and the second SIM 102-N communicating over at least the second communication path 106-1 with at least the first application 104-1 and/or component 105-1, without using the first communication path 106-1. The method comprising the steps of initially setting up the platform by: downloading 501 the second SIM 102-N, 102N'; activating 502 the second SIM 102-N, 102N'; transferring 503 an encrypted command comprising the identity associated with the service domain services; and enabling 504 a security feature of the service domain services.

The invention claimed is:

1. A mobile telephone device, comprising:
    a mobile broadband module comprising radio communication means;
    at least a first subscriber identity module (SIM) for providing user domain services;
    at least a second subscriber identity module (SIM) for providing service domain services, the second SIM being separate, apart and distinct from the first SIM and further being isolated from an end user of the mobile telephone device such that the end user is unable to perform any device operation that requires access to the second SIM;
    an application or a component;
    a first communication path internal to the mobile telephone device for providing communication between the application or the component and the mobile broadband module; and
    a second communication path internal to the mobile telephone device for providing communication between the application or the component and the mobile broadband module, wherein
    the first SIM is configured to communicate over at least the first communication path with at least the application or the component, and
    the second SIM is configured to communicate over at least the second communication path with at least the application or the component without using the first communication path.

2. The mobile telephone device according to claim 1, wherein
    the first SIM is associated with the end user of the mobile telephone device, and
    the second SIM is associated with a service provider.

3. The mobile telephone device according to claim 2, wherein communication between the service provider and the mobile telephone device is transparent to the end user of the mobile telephone device.

4. The mobile telephone device according to claim 2, wherein the second SIM enables the service provider to control applications on the mobile telephone device via communication with the mobile telephone device over the radio communication means.

5. The mobile telephone device according to claim 1, further comprising:
a decision processor for determining whether to continue or discontinue with a command by identifying which of the first and the second communication paths the command is issued from, such that the end user is not able to perform operation on to access the isolated second SIM.

6. The mobile telephone device according to claim 1, wherein the first communication path is a first interface and the second communication path is a second interface.

7. The mobile telephone device according to claim 6, wherein the first interface and second interface is a Peripheral Component Interconnect Express, PCIe, interface wherein one of the first and send interface is arranged on the Universal Serial Bus, USB, interface pins and the other is arranged on the System Management Bus, SMBus.

8. The mobile telephone device according to claim 1, wherein the first communication path is a first logical data channel and wherein the second communication path is a second logical data channel.

9. The mobile telephone device according to claim 8, wherein the first and the second logical channels at least are interfacing to virtual components or applications.

10. The mobile telephone device according to claim 1, wherein the second SIM comprises a physical component embedded in the broadband module or in another part of the device, the physical component accommodating a SIM application or virtual SIM component.

11. The mobile telephone device according to claim 10, wherein the physical component of the second SIM is a Universal Integrated Circuit Card, UICC, MCIM or eSIM, embedded on the mobile telephone device or in the broadband module.

12. The mobile telephone device according to claim 1, further comprising a third SIM.

13. The mobile telephone device according to claim 1, wherein the first SIM and the second SIM communicates with the broadband module via at least one internal interface and wherein communication on said internal interface for the first and the second SIM is multiplexed, such that applications and/or components in the mobile telephone device or broadband module can read SIM related information at least sequentially.

14. The mobile telephone device according to claim 1, wherein the radio communication means comprises at least two radio stacks, permitting two user entities being associated with the first and second SIM to be at least attached to a radio network simultaneously.

15. The device according to claim 2, wherein the second SIM is configured to allow the service provider to perform one or more of: i) continued tracking of the device in the event the device is stolen from the end user and ii) disabling the device in the event the device is stolen from the end user.

16. A method for a device comprising: (a) a mobile broadband module comprising radio communication means; (b) at least a first subscriber identity module, SIM, for providing user domain services; (c) a second subscriber identity module, SIM, separate, apart and distinct from the first SIM, for providing service domain services; (d) an application or a component; (e) a first communication path for providing communication between the application or the component and the mobile broadband module; (f) a second communication path for providing communication between the application or the component and the mobile broadband module, wherein the first SIM communicates over at least the first communication path with the application or the component, and the second SIM communicates over at least the second communication path with the application or the component without using the first communication path, the method comprising:
identifying which of the first and the second communication paths a command is issued from; and
determining whether to continue or discontinue with the command, wherein the determination is dependent on the identified path, such that the end user is not able to perform operation on to access the isolated second SIM.

17. The method according to claim 16, further comprising initially setting up the device prior to performing the identifying step, wherein
the step of initially setting up the device comprises:
downloading the second SIM;
activating the second SIM;
transferring an encrypted command comprising the identity associated with the service domain services; and
enabling a security feature of the service domain services.

18. A method for use in a device comprising: (a) a mobile broadband module comprising radio communication means; (b) at least a first subscriber identity module, SIM, for providing user domain services; (c) a second subscriber identity module, SIM, separate, apart and distinct from the first SIM, for providing service domain services; (d) an application or a component; (e) a first communication path for providing communication between the application or the component and the mobile broadband module; (f) a second communication path for providing communication between the application or the component and the mobile broadband module, wherein the first SIM communicating over the first communication path with the application or the component, and the second SIM communicating over the second communication path with the application or the component without using the first communication path, the method comprising initially setting up the device by:
downloading the second SIM;
activating the second SIM;
transferring an encrypted command comprising an identity of a service provider that provides the service domain services; and
enabling a security feature of the service domain services.

19. The method according to claim 18, further comprising:
in the event the device is stolen from an end user of the device, using the second SIM to perform one or more of:
i) continued tracking of the device and ii) disabling the device.

* * * * *

UNITED STATES PATENT AND TRADEMARK OFFICE
CERTIFICATE OF CORRECTION

| | | |
|---|---|---|
| PATENT NO. | : 8,874,077 B2 | Page 1 of 1 |
| APPLICATION NO. | : 13/368695 | |
| DATED | : October 28, 2014 | |
| INVENTOR(S) | : Bergenwall | |

It is certified that error appears in the above-identified patent and that said Letters Patent is hereby corrected as shown below:

In the Specification

In Column 1, Line 32, delete "Mobile." and insert -- Mobile --, therefor.

In Column 11, Line 57, delete "106-1" and insert -- 107-1 --, therefor.

In Column 12, Line 26, delete "106-1" and insert -- 107-1 --, therefor.

In the Claims

In Column 13, Line 23, in Claim 7, delete "send" and insert -- second --, therefor.

In Column 13, Line 58, in Claim 15, delete "device" and insert -- mobile telephone device --, therefor.

Signed and Sealed this
First Day of September, 2015

Michelle K. Lee
*Director of the United States Patent and Trademark Office*